United States Patent [19]

Gaudio et al.

[11] Patent Number: 5,223,032
[45] Date of Patent: Jun. 29, 1993

[54] PARTICULATED ASPHALT COMPOSITION AND PROCESS

[76] Inventors: Michael M. Gaudio; Christopher C. Guzaldo, both of 4415 W. Montrose Ave., Chicago, Ill. 60641

[21] Appl. No.: 731,508

[22] Filed: Jul. 17, 1991

[51] Int. Cl.⁵ .............................................. C08L 95/00
[52] U.S. Cl. .................................. 106/282; 106/281.1; 106/278
[58] Field of Search ...................... 106/278, 282, 281.1

[56] References Cited

U.S. PATENT DOCUMENTS

| | | | |
|---|---|---|---|
| 3,923,537 | 12/1975 | Wood | 106/283 |
| 4,298,397 | 11/1981 | Burris | 404/17 |
| 4,422,878 | 12/1983 | Fry | 106/282 |
| 4,549,834 | 10/1985 | Allen | 404/17 |

OTHER PUBLICATIONS

Barth, *Asphalt*, Gordon and Breach, N.Y., (1962), pp. 559–589 (no month).
*Compressed Air*, "Recycling Asphalt . . . ", (Sep. 1982,) pp. 14–17.

*Primary Examiner*—David Brunsman
*Attorney, Agent, or Firm*—Patula & Associates

[57] ABSTRACT

The present invention is a particulated asphalt composition and process for producing same. The composition is a cold mix product for construction and repair of asphalt-containing products using asphalt particulate, roughage and solvent, with the asphalt to roughage ratio ranging from one part asphalt to between four and forty parts roughage, and with solvent comprising three to ten gallons per ton weight composition.

18 Claims, No Drawings

PARTICULATED ASPHALT COMPOSITION AND PROCESS

This invention relates generally to particulating asphalt for use in construction, repair and maintenance of asphalt-containing products and, more specifically, to products manufactured from recycling asphalt from reclaimed asphalt product refuse for construction, repair and maintenance products.

BACKGROUND OF THE INVENTION

Before asphalt was discovered to have useful properties, particularly as a water sealant for roofing applications and cementing material for pavement applications, asphalt was discarded as a waste product of petroleum. Today, however, asphalt is widely used in the construction industry, especially in the roofing and paving industries.

In addition to asphalt being a useful by-product of petroleum, asphalt demonstrates marked properties for being reusable. It does not deteriorate significantly over time and use, therefore, it can be reused numerous times by recycling, rejuvenating and reprocessing.

Environmental concerns of current times have commanded increased efficiency and awareness in recycling numerous types of materials and products. Asphalt, given its marked recyclability, is one such product. Many methods and apparatuses exist for manufacturing asphalt, for forming asphalt into asphalt products, for recycling asphalt from asphalt-containing materials, for recycling asphalt from reclaimed asphalt product refuse, such as roofing refuse, and for using recycled asphalt for construction repair and maintenance purposes.

U.S. Pat. No. 4,706,893 teaches a method and apparatus for recycling asphalt shingles by heating and drying aggregate in an asphalt plant, then mixing the heated and dried aggregate with liquid asphalt to form an asphalt paving composition. This patent discloses a process of shredding waste shingles into small pieces, feeding the pieces into a drying drum to melt them, adding liquid asphalt, then mixing the aggregate, shingle material and liquid asphalt thoroughly.

Another method and apparatus for recycling asphalt aggregate compositions is disclosed in U.S. Pat. No. Re. 31,904. This art teaches the use of asphalt aggregate crushed and metered into different sized pieces. Coarse and fine bits of asphalt aggregate are introduced into a rotatable drum where they are melted in a distinct heating zone of the drum. This patent teaches the reduction of pollution caused by overheating asphalt aggregate by controlling the heating process and, particularly, by concentrating heating of non-asphalt aggregate in a hot zone of the drum, and heating asphalt aggregate in a cooler zone of the drum.

Other patents focus on hot asphalt pavement mix. U.S. Pat. Nos. 4,540,287, 4,147,436 and 4,075,710 teach methods and apparatuses of recycling asphalt for producing hot asphalt mixes. Generally, this involves heating asphalt aggregate in a heating zone, and mixing the heated aggregate with reclaimed asphalt and a binder to produce hot asphalt pavement mix. These patents vary generally based upon the configuration of the heating drum, the zones within the drum, and the steps in the process for recycling the asphalt getting to and within the drum. See also U.S. Pat. Nos. 4,325,641, 4,177,080, 4,104,736, 3,999,743, and 3,975,002.

Cold patch compositions also are taught by the prior art. U.S. Pat. No. 3,930,000, for example, discloses an elastomeric cold patch for pavement repair comprised of asphalt aggregate and rubber. The asphalt is heated, then rubber is added to form a gel mixture, and then the mixture is allowed to cool. The resulting cold patch is applied by cleaning the area to be repaired and applying a substance to create a sticky surface, such as by hot asphalt, to which the cold patch sheet will stick.

Unlike the prior art, the present invention does not involve an asphalt heating process for producing asphalt products. Heating causes numerous manufacturing, energy resource and pollution complications. It also is more costly than the process and composition of the present invention. The present invention concentrates primarily on cold mix preparations of asphalt products from particulated asphalt, especially using recycled asphalt, for pavement construction, repair and maintenance of asphalt-containing products. The products of the present invention have primary applications in the construction industry, and differ from the prior art through the use of asphalt particles as opposed to liquid asphalt to form asphalt products.

It is therefore one object of the present invention to provide a composition for an asphalt product formed of asphalt particulate as opposed to liquid asphalt for construction, repair and maintenance of asphalt-containing products.

Another object of the present invention is to provide a composition for cold mix asphalt construction, repair and maintenance of asphalt-containing products which does not require heating of asphalt to produce the asphalt product.

Another object of the present invention is to provide a composition for asphalt product used to construct, repair or maintain other asphalt-containing products in the construction industry using recycled asphalt particulate.

Another object of the present invention is to provide a composition for recycled asphalt product used to construct, repair or maintain other asphalt-containing products in the pavement industry using asphalt particulate formed from recycled asphalt.

Yet another object of the present invention is to provide a composition for asphalt product used to construct, repair or maintain various pavement and roadway articles using asphalt particulate formed from recycled asphalt obtained from roofing refuse.

Still another object of the present invention is to provide a process for producing an asphalt product for construction, repair and maintenance of asphalt-containing products, particularly in the construction industry, using particulated asphalt as opposed to liquid asphalt.

Another object of the present invention is to provide a process for producing a recycled asphalt product for construction, repair and maintenance using particulated asphalt from recycled asphalt-containing materials and, in particular, roofing refuse.

Yet another object of the present invention is to provide a composition and process for construction, repair and maintenance of products using recycled asphalt-containing materials and, in particular, roofing refuse, without the use of high-energy, high-polluting devices such as hot mix compositions and processes currently available.

These and other objects, features and advantages of the present invention will become apparent from the following description when considered in connection with the accompanying examples.

SUMMARY OF THE INVENTION

The present invention is a particulated asphalt composition and process for producing same. The composition is a cold mix product capable of being used in many construction applications, such as for repairing or constructing paved areas, paving blocks, erosion stabilization and haul road and storage yard stabilization. In particular, this invention is a cold mix construction, repair and maintenance composition and process for producing same, which composition combines particulated asphalt, preferably formed from reclaimed asphalt-product refuse, roughage and solvent.

The first component of the present invention is comprised of roughage, preferably rubble formed, for example, from crushed concrete, asphalt pavement, sand and/or stone, or any combination thereof. The roughage also may be comprised of fibrous material bits such as fiberglass, rubber or plastic particles, with or without any or all of the roughage constituents mentioned above. According to the present invention, the roughage is crushed and screened to a gradient size ranging from ¼" minus to 2" minus, preferably ⅜" minus gradient. The roughage then can be heated to eliminate moisture, although cold process preparation is viable at ambient temperatures exceeding 32 degrees Fahrenheit.

Asphalt, the second component of the present invention, then is granulated into asphalt particulate. In the case of recycled asphalt, asphalt-containing product such as reclaimed asphalt roofing is ground and screened for purity. The asphalt particulate is sized from between ¼" minus gradient to 2" minus gradient, preferably ⅜" minus gradient, and then added to the roughage to form an asphalt-aggregate comprising roughage-to-asphalt parts per weight ratios ranging between one part asphalt to forty parts roughage, and one part asphalt to two parts roughage, with the most desirable ratio comprised of one part asphalt to eight parts roughage.

The order of crushing and screening asphalt versus roughage may be reversed. Also, the crushing and screening of asphalt and roughage may be simultaneous, such as when asphalt pavement or other asphalt-containing roughage product is used, provided the percentage of asphalt in the asphalt-containing product is adequate enough to produce the desired composition of the present invention.

The asphalt and roughage, once blended together to form asphalt-aggregate, are mixed with the third component of the invention which is a solvent. The preferred solvent of the present invention is oil, particularly light oil or the equivalent of (1) part #2 and (3) parts #6 and 1 part waste oil or an alternative, added to the asphalt-aggregate in amounts of between two and one-half gallons and ten gallons per total composition ton weight of asphalt, roughage and solvent. The most desirable amount of solvent for producing the final composition is approximately five or six gallons preferably five gallons of solvent per ton weight composition.

Numerous other advantages and features of the invention will become readily apparent from the detailed description of the preferred embodiment of the invention, from the claims, and from the accompanying drawings, in which like numerals are employed to designate like parts throughout the same.

DETAILED DESCRIPTION OF THE INVENTION

While the invention is susceptible of embodiment in many different forms there is shown in the drawings and will be described herein in detail, a preferred embodiment of the invention. It should be understood, however, that the present disclosure is to be considered an exemplification of the principles of the invention and is not intended to limit the spirit and scope of the invention and/or claims of the embodiment illustrated.

The composition and process of the present invention applies to construction, repair and maintenance products for asphalt-containing materials, particularly for use in the pavement industry. The composition is comprised generally of roughage, asphalt particulate and solvent.

According to the preferred embodiment of the present invention, the first component of the invention, roughage, is formed from rubble comprised of crushed concrete, asphalt pavement, sand and/or stone, or any combination thereof. The roughage is crushed and screened to a gradient size ranging from ¼" minus to 2" minus and preferably sized to approximately ⅜" minus gradient. The roughage then can be heated to eliminate moisture, although cold process preparation is viable at ambient temperatures exceeding 32 degrees Farenheit. Additionally, the roughage may be comprised of fibrous material bits such as fiberglass, rubber or plastic particles, in any combination thereof, with or without any or all of the roughage constituents mentioned above.

Asphalt, the second component of the present invention, then is granulated into asphalt particulate. This is achieved by processing the asphalt through size reduction equipment. The asphalt can be either virgin asphalt blocks or reclaimed asphalt-containing material such as roofing refuse. The asphalt is ground and screened for purity. The asphalt particulate is sized from between ¼" minus gradient to 2" minus gradient, preferably sized to approximately ⅜" minus gradient. The order of crushing and screening the asphalt versus roughage described above may be reversed.

The particulated asphalt and crushed roughage then are mixed together to form an asphalt-aggregate comprising roughage-to-asphalt parts per composition weight ratios ranging between one part asphalt to forty parts roughage, and one part asphalt to two parts roughage, with the most desirable ratio comprised of one part asphalt to eight parts roughage. Percentage weights of component per composition vary from 75% weight composition roughage to 96% weight composition roughage, 2% weight asphalt particulate to 20% weight asphalt particulate, and 1% weight solvent to 3% weight solvent.

The asphalt-aggregate then is mixed with the third component of the invention which is a solvent, to effect the composition of the present invention. The solvent additive preferably is varied to correspond to construction or repair weather temperatures. In warmer temperatures, a water-based solvent is the preferable solvent additive. In pavement applications, the water constituent of the water-based solvent relatively rapidly evaporates from the cold mix composition after pavement construction or repair application, to leave a rigid compound capable of withstanding roadway pressures.

In colder temperatures, an oil-based solvent is preferable to prevent freezing of the solvent constituent within the composition and mixing equipment used to carry the solvent to the asphalt-aggregate for preparation of the end composition. The oil constituent also evaporates, but at a much slower rate than water.

Thus, in warmer temperatures, the solvent of the preferred embodiment of the invention is comprised of a water-based emulsion type rejuvenator, such as that known by the trade name "Reclaimite" by Witco Oil Co. of Oildale, Calif. "Reclaimite" is a blend of oils suspended in water to form an emulsion capable of dispersing the oils to lubricate the product to which it is applied. With water as the carrier of these oils, the water is left to evaporate, leaving the oils to be absorbed by the subject product, thereby causing softening, reconditioning and rejuvenating of the subject asphalt product. Thus, after mixing the water-based solvent with the asphalt-aggregate, the final asphalt composition of the present invention can be stockpiled for thirty to sixty days to allow the water portion of the emulsion to evaporate.

When ambient temperatures drop below 32 degrees Farenheit, and the water-based solvent is replaced with an oil-based solvent to prevent complications caused by water freezing and causing the product to become difficult to use or unusable, as noted above, the preferred oil-based solvent is #4 fuel oil or an alternative available from Torco Oil Company, Chicago, Ill. When the oil-based solvent is used, the composition of the present invention need not be stockpiled more than two days before use; therefore, when the material cannot be stockpiled for an adequate period of time, or during cooler weather, the oil-based solvent is preferred.

The oil-based solvent may be a combination of various weights of oil, which may include mixtures of the lightest oil, assigned the number "1" by industry standards, through heaviest oil, assigned the number "6" by industry standards, along with waste oils and sludge blended in varying proportions from using #1 oil only to #6 oil only, with or without waste oil blended in up to 20% by weight of solvent composition. The most desirable oil solvent composition is comprised of #4 oil, but may also be derived by combining one part #2 oil, three parts #6 oil and one part waste oil to effect between two and one-half gallons and ten gallons of solvent per ton weight total composition of asphalt, roughage and solvent. The most desirable amount of solvent for producing the final composition is approximately five or six preferably gallons of solvent per ton weight of total asphalt-aggregate and solvent to produce the final composition of the present invention.

After the addition of solvent, the composition is mixed at temperatures not less than 32 degrees Farenheit and not more than 700 degrees Farenheit if the solvent is a water-based emulsion. When using an oil-based solvent, however, mixing temperatures can drop beyond minus 50 degrees Farenheit. Prior to the addition of solvent and in the alternative to a cold mix preparation, heat may be applied to the crushed and sized roughage in temperatures ranging between 125 degrees Farenheit and 300 degrees Farenheit, with 225 degrees Farenheit being the most desirable temperature. Such heating will cause the water to evaporate rapidly and consequently accelerate the softening process, thereby shortening the amount of time needed in the stockpile to two days, which is approximately the same amount of time that is required when the oil-based solvent or rejuvenator is used. The resultant product is a cold mix composition used for repairing, maintaining or constructing asphalt-containing articles, particularly roadway pavement and related products.

According to the preferred embodiment of the invention, the process of the present invention involves the steps of shredding and reducing asphalt into asphalt particulate. The asphalt can be derived from a virgin source such as unused asphalt blocks, or can be recycled asphalt, such as asphalt reclaimed from an asphalt-containing product, including but not limited to roofing refuse. In the case of the latter, the recycled asphalt is prepared by stockpiling the refuse, flattening and mixing it to homogenize the refuse, then proceeding to screen the refuse to eliminate unwanted particles and refine the refuse mixture to retain asphalt particles. In the case of either virgin asphalt or reclaimed asphalt, the asphalt is shredded and thereby size reduced until the asphalt particulate is, preferably, approximately $\frac{3}{4}''$ minus gradient, but can range from $\frac{1}{4}''$ minus to 2" minus gradient.

Roughage is formed preferably from rubble comprised of concrete or pavement refuse which is crushed and sized into stones sized approximately $\frac{3}{8}''$ minus gradient, but ranging from $\frac{1}{4}''$ minus to 2" minus gradient. The roughage also may be comprised of fibrous material bits such as fiberglass, rubber or plastic particles or any combination thereof, with or without any or all other roughage constituents mentioned above. The aggregate may be passed through a heating unit to evaporate excess water from the aggregate, with the temperature of the heating unit ranging from 125 degrees to 300 degrees Farenheit, and preferably 225 degrees Farenheit, after which the heated aggregate can be allowed to cool. The crushed roughage then is mixed in with the crushed and screened particles to which solvent then is added to produce the cold mix composition of the present invention.

The following examples illustrate practice of the invention by which the particulated asphalt composition and process are achieved. Example 1 illustrates a cold mix composition for pavement repair, such as for filling potholes, using a water-based solvent. Example 2 illustrates a cold mix composition for pavement repair using an oil-based solvent. Example 3 illustrates a cold mix composition for paving blocks. Example 4 details a cold mix composition for erosion stabilization. Example 5 discloses a cold mix composition for haul road and storage yard stabilization. Example 6 illustrates a cold mix composition for a cold pavement application of the present invention. These examples are for illustrative purposes and are not intended in any way to limit the scope of the invention.

EXAMPLE 1

According to the preferred embodiment of the invention, reclaimed asphalt roofing refuse was prepared by stockpiling the refuse, flattening and mixing it using a bulldozer to homogenize the refuse, then screening the refuse to eliminate unwanted particles and refine the refuse mixture to retain asphalt particles. The refined mixture then was shredded using a Model #1200 shredder manufactured by Lundell of Cherokee, Iowa, and thereby reduced in size to a $\frac{3}{4}''$ minus gradient using a steel mesh three deck vibratory screen available from Simplicity Company of Durand, Mich., through which screen the asphalt particulate was passed if $\frac{3}{4}''$ sized or smaller, with larger particulate being returned to the shredder for further size reduction and screening.

Concrete and pavement refuse then was crushed into roughage using a Model #3042 portable jaw crusher manufactured by Pioneer Company of Yankton, S. Dak. The roughage was sized using a steel mesh three deck vibratory screen available from Simplicity Company of Durand, Mich., through which screen the roughage was passed if ⅜" sized or smaller, with larger pieces of roughage being returned to the crusher for further size reduction and screening. The sized roughage then was passed through a Cedarapids brand dryer unit, manufactured by Iowa Manufacturing Company of Cedar Rapids, Iowa, for three (3) minutes at 225 degrees Farenheit to evaporate water from the roughage, after which the heated roughage can be allowed to cool to ambient temperature. The roughage then was mixed in with the crushed and screened asphalt particles using a pugmill mixer, Model #828 available from Iowa Manufacturing Company of Cedar Rapids, Iowa, in a ratio of eight parts roughage per weight composition to one part asphalt particulate per weight composition, approximately 1725 pounds roughage to 225 pounds asphalt particulate. Approximately seven gallons of water-based solvent per ton weight composition, sold under the brand name "Reclaimite" by Witco Oil Company of Oildale, Calif., was added to the asphalt-aggregate mixture and blended therewithin to produce the cold mix composition of the present invention for patching pavement potholes and large cracks.

EXAMPLE 2

According to an alternative preferred embodiment of the invention, reclaimed asphalt roofing refuse was prepared by stockpiling the refuse, flattening and mixing using a bulldozer to homogenize the refuse, then screening the refuse to eliminate unwanted particles and refine the refuse mixture to retain asphalt particles. The refined mixture then was shredded using the Lundell Model #1200 shredder, and thereby reduced in size to a ¾" minus gradient using the Simplicity three deck vibratory steel mesh screen through which the asphalt particulate was passed if ¾" sized or smaller, with larger particulate being returned to the shredder for further size reduction and screening.

Concrete and pavement refuse then was crushed into roughage using the Pioneer Model #3042 portable jaw crusher. The rubble was sized using the Simplicity three deck vibratory steel mesh screen, through which the roughage was passed if ⅜" sized or smaller, with larger pieces of roughage being returned to the crusher for further size reduction and screening. The sized roughage then was passed through a Cedarapids brand heating unit, manufactured by Iowa Manufacturing Company of Cedar Rapids, Iowa for three (3) minutes at 225 degrees Farenheit to evaporate water from the roughage, after which the heated roughage can be allowed to cool to ambient temperature. The roughage then was mixed, using the Cedar Rapids Model #828 pugmill mixer, in with the crushed and screened asphalt particulate in a ratio of eight parts roughage per weight composition to one part asphalt particulate per weight composition or, approximately 1725 pounds roughage to 225 pounds asphalt particulate. Approximately five gallons of oil-based solvent per ton weight composition, said solvent comprised of one part #2 oil, three parts #6 oil and one part waste oil, all available from Torco Oil Company of Chicago, Ill., was added to the asphalt-aggregate mixture and blended therewithin to produce the cold mix composition of the present invention for repairing pavement potholes and large pavement cracks in colder temperatures such as in freezing conditions caused by winter weather.

EXAMPLE 3

In a third alternative embodiment of the present invention, a composition of cold mix was found to be particularly well-suited for use in forming paving blocks. In this composition, the same constituents of roughage formed from crushed pavement sized to ⅜" minus gradient, crushed asphalt from reclaimed roofing refuse sized to ¾" minus gradient, and solvent as used in Examples 1 and 2 were combined to form paving blocks. In this embodiment, a one ton batch of the composition was formed of one part asphalt particulate per weight composition or approximately 390 pounds, four parts roughage per weight composition or approximately 1560 pounds, and six gallons of water-based solvent or 4.5 gallons of oil-based solvent per ton weight composition, with the choice of water versus oil-based solvent depending upon ambient temperature conditions in accordance with the detailed description of the invention stated above.

EXAMPLE 4

In a fourth alternative embodiment of the present invention, a composition of cold mix was found to be particularly well-suited for use in providing erosion stabilization. In this composition, the same constituents as used in Examples 1 and 2, roughage formed from crushed pavement sized to ⅜" minus gradient, crushed asphalt from reclaimed roofing refuse sized to ¾" minus gradient and solvent, were combined to form an erosion stabilization product. In this embodiment, a one ton batch of the composition was formed of one part asphalt particulate per weight composition or approximately 218 pounds, eight parts roughage per weight composition or approximately 1736 pounds, and five gallons of water-based solvent or 3.75 gallons of oil-based solvent per ton weight composition, with the choice of water versus oil-based solvent depending upon ambient temperature conditions as stated above in the detailed description of the invention.

EXAMPLE 5

In a fifth alternative embodiment of the present invention, a composition of cold mix was found to be particularly well-suited for use in providing haul road and storage yard pavement stabilization. In this composition, the same constituents as used in Examples 1 and 2, roughage formed from crushed pavement sized to ⅜" minus gradient, crushed asphalt from reclaimed roofing refuse sized to ¾" minus gradient and solvent, were combined to form a haul road and storage yard pavement stabilization product. In this embodiment, a one ton batch of the composition was formed of one part asphalt particulate per weight composition or approximately 55 pounds, thirty-five parts roughage per weight composition or approximately 1915 pounds, and five gallons of water-based solvent or 3.75 gallons of oil-based solvent per ton weight composition, with the choice of water versus oil-based solvent depending upon ambient temperature conditions as detailed in the description of the invention above.

EXAMPLE 6

In a sixth alternative embodiment of the present invention, a composition of cold mix was found to be particularly well-suited for use in cold pavement applications. In this composition the same constituents as used in Examples 1 and 2, roughage formed from crushed pavement sized to ¾" minus gradient, crushed asphalt from reclaimed roofing refuse sized to ¾" minus gradient and solvent, were combined to form a cold pavement product. In this embodiment, a one ton batch of the composition was formed of one part asphalt particulate per weight composition or approximately 75 pounds, twenty-five parts ground and screened roughage per weight composition or approximately 1875 pounds, and seven gallons of water-based solvent or four gallons of oil-based solvent, with the choice of water versus oil-based solvent depending upon ambient temperature conditions as detailed in the description of the invention above.

The foregoing specification describes only the preferred embodiment of the invention as shown. Other embodiments besides these described and claimed herein may be articulated as well. The terms and expressions therefore serve only to describe the invention by example only and not to limit the invention. It is expected that others will perceive differences which while differing from the foregoing, do not depart from the spirit and scope of the invention herein described and claimed.

What is claimed is:

1. A solid composition for construction and repair of asphalt-containing products consisting essentially of:
   a quantity of roughage ranging from approximately four parts per weight composition to forty parts per weight composition, said roughage being crushed and sized between 2" gradient and ¼" gradient;
   a quantity of particulated asphalt comprising ground reclaimed asphalt roofing materials approximately one part per weight composition, said particulated asphalt being crushed and sized between 2" gradient and ¼" gradient;
   a quantity of solvent combined with said roughage and said particulated asphalt ranging from two and one-half gallons per ton weight composition to ten gallons per ton weight composition.

2. The composition recited in claim 1 above, wherein said solvent consists of eight gallons of water-based solvent, plus or minus one gallon, for use of said composition in temperatures warmer than 32 degrees Farenheit.

3. The composition recited in claim 1 above, wherein said solvent consists of six gallons of oil-based solvent, plus or minus one gallon, for use of said composition in temperatures equal to or below 32 degrees Farenheit.

4. The composition recited in claim 1 above, wherein said roughage comprises four parts per weight composition and said solvent is water-based and comprises seven gallons, plus or minus one gallon, per ton weight composition.

5. The composition recited in claim 1 above, wherein said roughage comprises four parts per weight composition and said solvent is oil-based and comprises six gallons, plus or minus one gallon, per ton weight composition.

6. The composition recited in claim 1 above, wherein said roughage comprises five parts per weight composition and said solvent is water-based and comprises eight gallons, plus or minus one gallon, per ton weight composition.

7. The composition recited in claim 1 above, wherein said roughage comprises five parts per weight composition and said solvent is oil-based and comprises six gallons, plus or minus one gallon, per ton weight composition.

8. The composition recited in claim 1 above, wherein said roughage comprises eight parts per weight composition and said solvent is water-based and comprises five gallons, plus or minus one gallon, per ton weight composition.

9. The composition recited in claim 1 above, wherein said roughage comprises eight parts per weight composition and said solvent is oil-based and comprises three and three-fourths gallons, plus or minus one gallon, per ton weight composition.

10. The composition recited in claim 1 above, wherein said roughage comprises seven parts per weight composition and said solvent is water-based and comprises five gallons, plus or minus one gallon, per ton weight composition.

11. The composition recited in claim 1 above, wherein said roughage comprises seven parts per weight composition and said solvent is oil-based and comprises three and three-fourths gallons, plus or minus one gallon, per ton weight composition.

12. The composition recited in claim 1 above, wherein said roughage comprises thirty-five parts per weight composition and said solvent is water-based and comprises seven gallons, plus or minus one gallon, per ton weight composition.

13. The composition recited in claim 1 above, wherein said roughage comprises thirty-five parts per weight composition and said solvent is oil-based and comprises four gallons, plus or minus one gallon, per ton weight composition.

14. The composition recited in claim 1 above, wherein said roughage comprises forty parts per weight composition and said solvent is water-based and comprises six gallons, plus or minus one gallon, per ton weight composition.

15. The composition recited in claim 1 above, wherein said roughage comprises forty parts per weight composition and said solvent is oil-based and comprises three and one-half gallons, plus or minus one gallon, per ton weight composition.

16. The composition recited in claim 1 above, wherein said roughage comprises between four and eight parts per weight composition and is formed of crushed pavement screened and sized to approximately ⅜" minus gradient, and said asphalt is crushed into asphalt particulate and sized to approximately ¾" minus gradient.

17. The composition recited in claim 1 above, wherein said roughage comprises between four and eight parts per weight composition and is formed of crushed pavement screened and sized to approximately ¾" minus gradient, and said asphalt is crushed into asphalt particulate and sized to approximately ¾" minus gradient.

18. A solid composition for construction and repair of asphalt-containing products consisting essentially of:
   a quantity of particulated asphalt comprising ground reclaimed asphalt roofing materials in the range of two to twenty percent weight composition, said particulated asphalt being crushed and sized between 2" gradient and ¼" gradient;
   a quantity of roughage ranging from approximately seventy-five to ninety-eight percent weight composition, said roughage being crushed and sized between 2" gradient and ¼" gradient;
   a quantity of solvent combined with said roughage and said particulated asphalt ranging from one to three percent weight composition.

* * * * *